(12) United States Patent
Park et al.

(10) Patent No.: US 10,096,391 B2
(45) Date of Patent: Oct. 9, 2018

(54) GAMMA-RAY SENSING PROBE USING CERENKOV EFFECT AND SYSTEM FOR IDENTIFYING BURNUP OF SPENT NUCLEAR FUEL ASSEMBLY USING THE SAME

(71) Applicant: SOONCHUNHYANG UNIVERSITY INDUSTRY ACADEMY COOPERATION FOUNDATION, Asan-si, Chungcheongnam-do (KR)

(72) Inventors: Byung Gi Park, Asan-si (KR); Bong Soo Lee, Seoul (KR); Kyoung Won Jang, Chungju-si (KR); Wook Jae Yoo, Gyeongju-si (KR); Sang Hun Shin, Seoul (KR)

(73) Assignee: SOONCHUNHYANG UNIVERSITY INDUSTRY ACADEMY COOPERATION FOUNDATION, Asan-si, Chungcheongnam-do (KR)

( * ) Notice: Subject to any disclaimer, the term of this patent is extended or adjusted under 35 U.S.C. 154(b) by 327 days.

(21) Appl. No.: 14/895,467

(22) PCT Filed: Jun. 20, 2013

(86) PCT No.: PCT/KR2013/005434
§ 371 (c)(1),
(2) Date: Dec. 2, 2015

(87) PCT Pub. No.: WO2014/196681
PCT Pub. Date: Dec. 11, 2014

(65) Prior Publication Data
US 2016/0111173 A1 Apr. 21, 2016

(30) Foreign Application Priority Data

Jun. 3, 2013 (KR) .................. 10-2013-0063565

(51) Int. Cl.
| | | |
|---|---|---|
| G21C 17/10 | (2006.01) | |
| G01T 1/22 | (2006.01) | |
| G01T 1/167 | (2006.01) | |

(52) U.S. Cl.
CPC .............. *G21C 17/10* (2013.01); *G01T 1/167* (2013.01); *G01T 1/22* (2013.01)

(58) Field of Classification Search
CPC ............ G21C 17/10; G01T 1/167; G01T 1/22
USPC .................................. 376/248, 257
See application file for complete search history.

(56) References Cited

U.S. PATENT DOCUMENTS

| | | | |
|---|---|---|---|
| 3,295,068 A | | 12/1966 | Honig |
| 3,984,332 A | * | 10/1976 | Nelson ...................... G01T 1/22 |
| | | | 250/368 |

(Continued)

FOREIGN PATENT DOCUMENTS

| | | |
|---|---|---|
| JP | 06-242249 A | 9/1994 |
| KR | 10-00650325 B1 | 11/2006 |
| KR | 10-1002720 B1 | 12/2010 |

OTHER PUBLICATIONS

Jang, "Development of a Fiber-Optic Cerenkov Radiation Sensor to Verify Spent Fuel: Characterization of the Cerenkov Radiation Generated from an Optical Fiber", Journal of the Korean Physical Society, vol. 61, No. 10, Nov. 2012, pp. 1704-1708. (Year: 2012).*

(Continued)

*Primary Examiner* — Jack W Keith
*Assistant Examiner* — Daniel Wasil
(74) *Attorney, Agent, or Firm* — Christensen O'Connor Johnson Kindness PLLC

(57) ABSTRACT

Gamma-ray sensing probes operating under the Cerenkov effect measure the burnup of spent nuclear fuel assemblies. The probes include an optical fiber that reacts to gamma rays coming from the spent nuclear fuel assembly and emit light via the Cerenkov effect. A scatterer surrounds the optical (Continued)

fiber to increase the light emitting efficiency of the optical fiber by the Compton electron scattering. A collimator composed of shielding material surrounds the scatterer. The collimator has a slit groove which is open in one direction for directing the gamma rays from the spent fuel assembly to the scatterer.

3 Claims, 4 Drawing Sheets

(56) References Cited

U.S. PATENT DOCUMENTS

| | | |
|---|---|---|
| 5,087,818 A | 2/1992 | Bellian |
| 9,358,406 B2 * | 6/2016 | Prieels ................. G01T 1/2914 |
| 9,759,823 B1 * | 9/2017 | Dowell ................. G01T 1/202 |
| 2009/0014665 A1 | 1/2009 | Fleming |

OTHER PUBLICATIONS

Lee, "Measurements of Cerenkov Lights Using Optical Fibers", IEEE Transactions on Nuclear Science, vol. 60, No. 2, Apr. 2013, pp. 932-936. (Year: 2013).*

International Search Report dated Mar. 3, 2014, issued in corresponding International Application No. PCT/KR2013/005434, filed Jun. 20, 2013, 5 pages.

Shin, S.H., et al., "Fundamental Research of Fiber-Optic Cerenkov Radiation Sensor for Verification of Spent Fuel," Proceedings of the Korean Radioactive Waste Society Conference, 2012, pp. 481-482, with English Abstract.

* cited by examiner

GAMMA-RAY SENSING PROBE USING CERENKOV EFFECT AND SYSTEM FOR IDENTIFYING BURNUP OF SPENT NUCLEAR FUEL ASSEMBLY USING THE SAME

TECHNICAL FIELD

The present invention relates to gamma-ray sensing probes using the Cerenkov effect, and systems for identifying the burnup of a spent nuclear fuel assembly using the gamma-ray sensing probes, and more particularly, to a gamma-ray sensing probe using the Cerenkov effect, and a system for identifying the burnup of a spent nuclear fuel assembly using the gamma-ray sensing probe, that are intended to identify the burnup of a spent nuclear fuel assembly, for which inspection is required under the regulation of delivery, before conveying the spent nuclear fuel assembly stored in an on-site storage pool of a nuclear power plant to an intermediate storage facility, the system for identifying the burnup of a spent nuclear fuel assembly being established using the gamma-ray sensing probe including: an optical fiber reacting to gamma rays coming from the spent nuclear fuel assembly by the Cerenkov effect and emitting light by itself; a scatterer surrounding the optical fiber to increase light emitting efficiency of the optical fiber by the Cerenkov effect; and a collimator configured to surround the scatterer and composed of a shielding material, the collimator having a slit groove which is open in one direction. Thus, when the gamma rays of the spent nuclear fuel assembly are measured using the gamma-ray sensing probe, since optical signals generated according to the Cerenkov effect resulting from gamma rays may be amplified by the scatterer surrounding the optical fiber, signal measurement can be easily performed, and the intensity of gamma rays coming from a specific gamma ray test surface of the spent nuclear fuel assembly, for which measurement is required, can be accurately measured by utilizing the collimator, thereby enabling burnup of the spent nuclear fuel assembly to be accurately determined.

BACKGROUND ART

Spent nuclear fuel generates radiation and heat for a long time due to a nuclear fission product included therein even after being pulled out from a nuclear reactor. Accordingly, in order to protect workers who work in an electric power station from radiation and to remove continuously generated heat, the spent nuclear fuel is stored in a water tank installed in a fuel building of the electric power station. A reinforced concrete structure in which the spent nuclear fuel is stored is called a spent fuel storage pool.

The spent nuclear fuel burned in a nuclear power plant has been wet-stored in the spent nuclear fuel storage pool which is an on-site storage facility. However, when the spent nuclear fuel storage pool reaches saturation point, the spent nuclear fuel, which has been burned, should be conveyed to and then stored in an intermediate storage facility. In the case where the spent nuclear fuel is intended to be conveyed to the facility for intermediate storage of the spent nuclear fuel, according to "the announcement of regulations for the delivery of spent nuclear fuel", an operator of the intermediate storage facility of the spent nuclear fuel should inspect all the matters concerning the burnup of a spent nuclear fuel assembly and the like and should then take delivery of the spent nuclear fuel. Thus, an inspection technique therefor has been needed.

Despite the fact that many measurement apparatuses for identifying burnup using gamma rays, neutrons generated from the spent nuclear fuel assembly, or a combination of them have been developed, it is disadvantageous in that the measurement apparatuses have too complicated configurations to apply to inspection and have a limit of measurement environment.

In order to measure the burnup of a spent nuclear fuel assembly, gamma rays coming from the spent nuclear fuel assembly should be first measured using a sensing part, and the burnup of the spent nuclear fuel assembly is then measured based on intensity of the measured gamma rays.

Although detectors measuring gamma rays using a scintillator have been recently developed, a technique for using such a scintillator is environmentally restricted because the scintillator should be maintained at an extremely low temperature in order to increase efficiency of a sensing part which reacts to gamma rays.

Even though there is also a case in which an optical fiber is used in order to sense gamma rays, it is problematic in that the technique has, as a technique for measuring gamma rays using a sensing part having an optical fiber scintillator (OFS), a limit in performing accurate measurement due to an extinction effect that is a problem generated from a scintillator.

DISCLOSURE OF INVENTION

Technical Problem

Accordingly, the present invention has been devised in order to solve the above problems, and an object of the present invention is to provide a gamma-ray sensing probe using the Cerenkov effect, and a system for identifying the burnup of a spent nuclear fuel assembly using the gamma-ray sensing probe, that are intended to identify the burnup of a spent nuclear fuel assembly, for which inspection is required according to the regulation of delivery, before conveying the spent nuclear fuel assembly stored in an on-site storage pool of a nuclear power plant to an intermediate storage facility, the system for identifying the burnup of a spent nuclear fuel assembly being established using the gamma-ray sensing probe including: an optical fiber reacting to gamma rays coming from the spent nuclear fuel assembly due to the Cerenkov effect and emitting light by itself; a scatterer surrounding the optical fiber to increase light emitting efficiency of the optical fiber due to the Cerenkov effect; and a collimator configured to surround the scatterer and composed of a shielding material, the collimator having a slit groove which is open in one direction, whereby when the gamma rays of the spent nuclear fuel assembly are measured using the gamma-ray sensing probe, since optical signals generated according to the Cerenkov effect resulting from gamma rays may be amplified by the scatterer surrounding the optical fiber, signal measurement can be easily performed, and the intensity of gamma rays coming from a specific gamma ray test surface in the spent nuclear fuel assembly, for which measurement is required, can be accurately measured by utilizing the collimator, thereby enabling burnup of the spent nuclear fuel assembly to be accurately determined.

Solution to Problem

In order to solve the problem, according to an aspect of the present invention, a gamma-ray sensing probe according to the present invention, that is intended to sense gamma-rays coming from a gamma-ray test surface of a spent nuclear fuel assembly in order to measure the gamma-rays coming from the spend nuclear fuel assembly, may include: an optical fiber disposed to face a gamma-ray test surface of a spent nuclear fuel assembly in a direction perpendicular to a lengthwise direction of the spent nuclear fuel assembly, the optical fiber reacting to gamma rays coming from the gamma-ray test surface and emitting light by the Cerenkov effect; a scatterer extending to the extent of a length of the gamma-ray test surface and formed to surround an outer circumferential surface of the optical fiber, the scatterer reacting to gamma rays incident from the gamma-ray test surface of the spent nuclear fuel assembly to the optical fiber and causing Compton scattering; and a collimator surrounding an outer circumferential surface of the scatterer and composed of a shielding material, the collimator having a slit groove formed at one side thereof, thereby passing only gamma rays coming from a part of the gamma-ray test surface, for which measurement is required, through the scatterer.

Advantageous Effects of Invention

As described above, according to a gamma-ray sensing probe using the Cerenkov effect, and a system for identifying the burnup of a spent nuclear fuel assembly using the gamma-ray sensing probe according to the present invention, when the gamma rays of the spent nuclear fuel assembly are measured using the gamma-ray sensing probe, since optical signals generated by the Cerenkov effect resulting from gamma rays may be amplified by the scatterer surrounding the optical fiber, signal measurement can be easily performed, and the intensity of gamma rays coming from a specific gamma ray test surface in the spent nuclear fuel assembly, for which measurement is required, can be accurately measured by utilizing the collimator. Thus, it is also effective to accurately identify burnup of the spent nuclear fuel assembly, for which inspection is required according to the regulations of delivery, when the spent nuclear fuel assembly stored in an on-site storage pool of a nuclear power plant is delivered to an intermediate storage facility.

BEST MODE FOR CARRYING OUT THE INVENTION

Hereinafter, embodiments of the present invention will be described in detail. However, the present invention should not be limited to the embodiments unless it deviates from the gist thereof.

Figure 1:
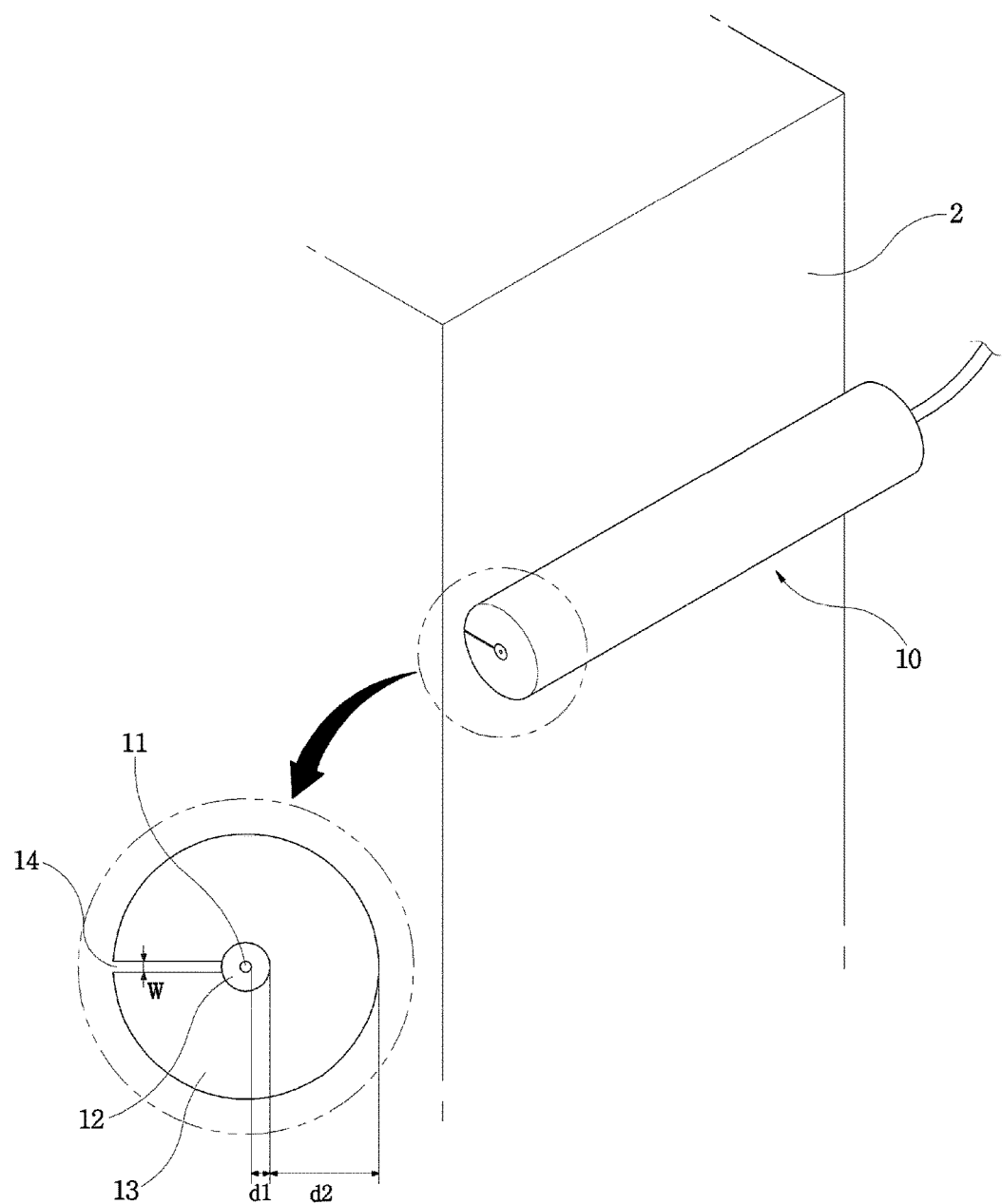
FIG. 1 is a view showing the structure of a gamma-ray sensing probe using the Cerenkov effect according to an embodiment of the present invention.
Figure 2:
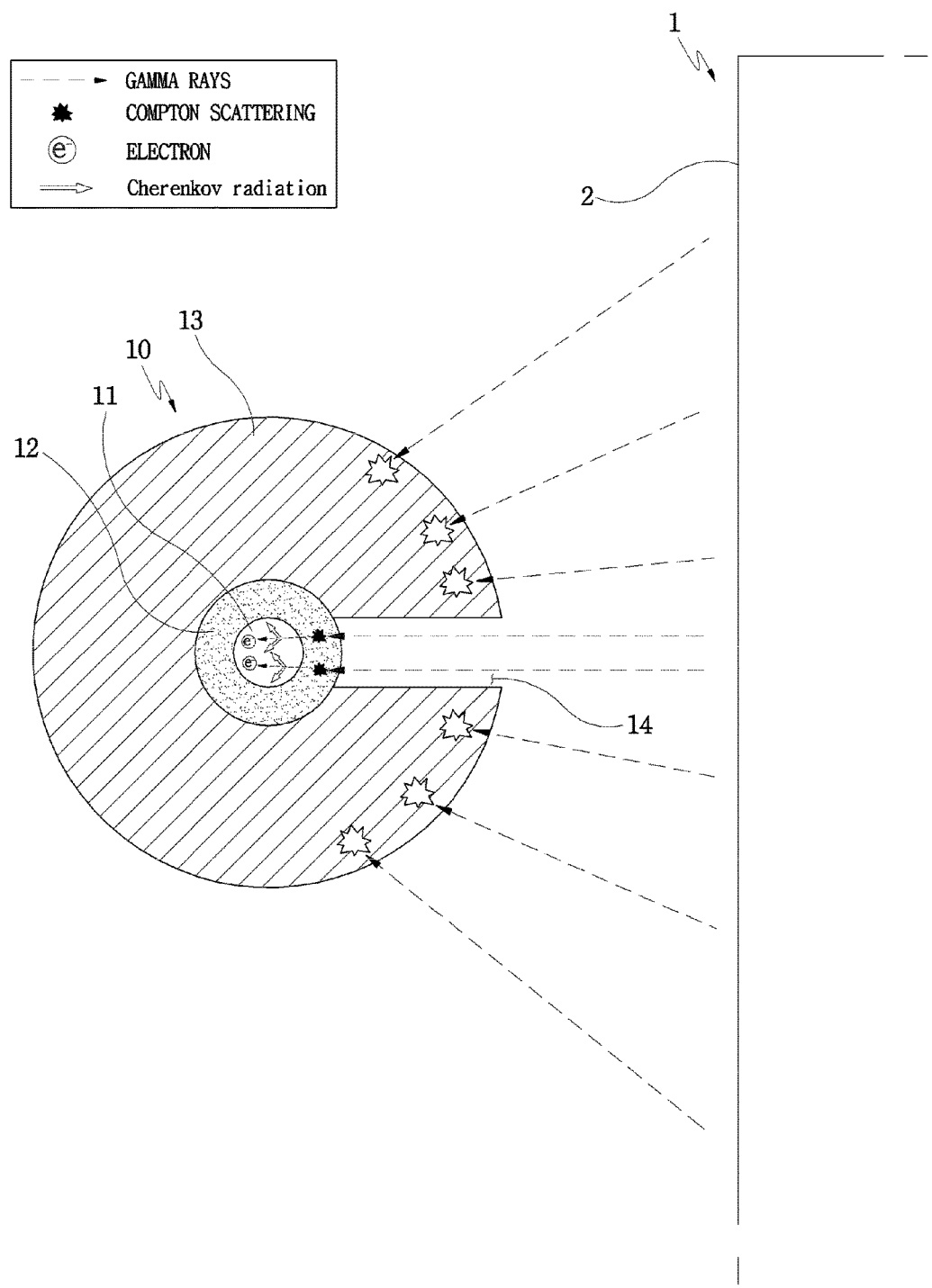
FIG. 2 is a view showing an operation of the gamma-ray sensing probe using the Cerenkov effect according to the embodiment of the present invention.

FIG. 1 is a view showing the structure of a gamma-ray sensing probe using the Cerenkov effect according to an embodiment of the present invention, and FIG. 2 is a view showing an operation of the gamma-ray sensing probe using the Cerenkov effect according to the embodiment of the present invention.

As illustrated in FIGS. 1 and 2, the gamma-ray sensing probe 10 using the Cerenkov effect includes: an optical fiber 11 disposed to face a gamma-ray test surface 2 of a spent nuclear fuel assembly 1 in a direction perpendicular to a lengthwise direction of the spent nuclear fuel assembly 1, the optical fiber reacting to gamma rays coming from the gamma-ray test surface 2 and emitting light by the Cerenkov effect; a scatterer 12 extending to the extent of a length of the gamma-ray test surface 2 and formed to surround an outer circumferential surface of the optical fiber 11, the scatterer reacting to gamma rays incident from the gamma-ray test surface 2 of the spent nuclear fuel assembly 1 to the optical fiber and causing Compton scattering; a collimator surrounding an outer circumferential surface of the scatterer 12 and composed of a shielding material, the collimator having a slit groove 14 formed at one side thereof, thereby passing only gamma rays coming from a part of the gamma-ray test surface 2, for which measurement is required, through the scatterer 12.

That is, the gamma-ray sensing probe using the Cerenkov effect according to the present invention, which is configured as described above, is installed in a system for identifying burnup of the spent nuclear fuel assembly according to the regulations of delivery when the spent nuclear fuel assembly stored in an on-site storage pool of a nuclear power plant is delivered to an intermediate storage facility. Thus, the gamma-ray sensing probe is a probe sensing gamma rays incident from the gamma-ray test surface of the spent nuclear fuel assembly so as to measure the gamma rays coming from the spent nuclear fuel assembly.

The optical fiber 11 is disposed to face the gamma-ray test surface 2 of the spent nuclear fuel assembly 1 in a direction perpendicular to a lengthwise direction of the spent nuclear fuel assembly 1 so that the gamma rays coming from the gamma-ray test surface 2 of the spent nuclear fuel assembly 1 is sensed.

The optical fiber 11 is composed of an optical fiber made of a general synthetic resin or glass material and reacts to the gamma rays coming from the spent nuclear fuel assembly 1 due to the Cerenkov effect, thereby causing self-radiation.

That is, when the gamma rays coming from the spent nuclear fuel assembly 1 pass through the optical fiber 11, Compton scattering is generated from the optical fiber 11. In this case, self-radiation by the Cerenkov effect is performed according to the luminous flux motion of electrons separated from a medium of the optical fiber 11 by the Compton scattering.

As such, when the gamma rays coming from the spent nuclear fuel assembly 1 are sensed using the optical fiber 11, in a case where intensity of the gamma rays coming from the spent nuclear fuel assembly 1 is large, the optical fiber of a glass material having a non-browning property rather than the optical fiber of a synthetic material is used so that the gamma rays can be stably sensed.

In addition, since the scatterer 12 is coated on the outer circumferential surface of the optical fiber 11, the optical fiber reacts to the gamma rays coming from the gamma-ray test surface 2 of the spent nuclear fuel assembly 1, thereby causing Compton scattering, so that a luminous effect of the optical fiber 11 can be increased.

That is, since the optical fiber 11 is typically formed to have a diameter of about 1 mm, a volume of the optical fiber, which reacts to the gamma ray, is small. Thus, since an amount of light generated by the Cerenkov effect is small, signal intensity also is not large. Due to this, as a means for supplementing this problem and increasing the signal intensity, the scatterer 12 is provided to surround the outer circumferential surface of the optical fiber 11.

Thanks to such a configuration, when the gamma rays coming from the spent nuclear fuel assembly 1 pass through the scatterer 12 surrounding the optical fiber 11, Compton scattering is generated. In this case, electrons generated by the Compton scattering penetrate the optical fiber 11 and thus perform a luminous flux motion so that the luminous effect of the optical fiber 11 by the Cerenkov effect can be increased.

In this case, the scatterer 12 may be formed to surround the outer circumferential surface of the optical fiber 11 by extending to the extent of length of the gamma-ray test surface 2 disposed to face the collimator and may be made of polyethylene (PE) or polymethyl methacrylate (PMMA) that is a material having high electron generation efficiency by Compton scattering.

In addition, the collimator 13 surrounding an outer circumferential surface of the scatterer 12 is provided at the optical fiber 11 coated with the scatterer, the collimator surrounding being composed of a shielding material, and having the slit groove 14 formed at one side thereof.

That is, the collimator 13 may be made of a shielding material composed of a material, such as lead or the like, which may shield and decrease the gamma ray, and may have the slit groove 14 formed at a position corresponding to a part opposite to the gamma-ray test surface 2, thereby passing only gamma rays coming from a part of the gamma-ray test surface 2 of the spent nuclear fuel assembly 1, for which measurement is required, through the scatterer 12.

In this case, as illustrated in FIGS. 1 and 2, the slit groove 14 formed at the collimator 14 is formed along a lengthwise direction of the collimator 13 at a position opposite to the gamma-ray test surface 2. A width w of the slit groove may range from 0.5 to 2 mm. In addition, the slit groove may be formed to have a width having the same size as a diameter of the optical fiber 11.

Thanks to this configuration, among gamma rays coming from the spent nuclear fuel assembly 1, the gamma rays coming from the gamma-ray test surface 2 of the part opposite to the slit groove 14 of the collimator 13 are incident to the scatterer 12 and the optical fiber 11 via the slit grooves 14, and the gamma rays coming from the gamma-ray test surface 2 of another part, which is not opposite to the slit groove 14, are shielded by the shieling material.

As such, the reason why the circumference of the optical fiber 11 is partially shielded so that only the gamma rays incident from the position opposite to the gamma-ray test surface 2 become incident to the optical fiber 11 is because it is intended to more accurately measure intensity of the gamma rays.

That is, when the gamma rays coming from the gamma-ray test surface 2 of the spent nuclear fuel assembly 1 are sensed using a probe including only the optical fiber 11, the probe is affected by the gamma rays originating from all positions of the spent nuclear fuel assembly 1. Due to this, in order to confirm a position of the spent nuclear fuel assembly 1 from which the measured gamma rays originate, it is problematic in that a complicated mathematical relation expression should be applied.

Accordingly, in the present invention, when the gamma-ray sensing probe 10 is configured, the collimator 13 surrounding the optical fiber 11 and the scatterer 12 is provided so that only gamma rays coming from the gamma-ray test surface 2 located at a position opposite to the slit groove 14 of the collimator are measured. Thus, when the gamma-ray sensing probe 10 measures the gamma rays combing from the gamma-ray test surface 2 while causing scanning in a lengthwise direction of the spent nuclear fuel assembly 1, intensity of the gamma rays may be accurately measured according to a measurement position.

Meanwhile, in the gamma-ray sensing probe 10 configured as described above, a thickness d1 of the scatterer surrounding the optical fiber 11 may range from 2 to 4 mm, and a thickness d2 of the shielding material constituting the collimator 13 may range from 25 to 35 mm.

In this case, when the scatterer 12 is configured, in a medium which is equivalent to water, the maximum depth of a dose of the gamma rays is 3 mm. In this depth, since electrons are maximally produced by Compton scattering, the thickness d1 of the scatterer may be formed in the range of 3 mm.

In addition, when the shielding material of the collimator 13 is configured, the larger a thickness of the shielding material is, attenuating and shielding efficiency are increased. However, in the case where a distance between the spent nuclear fuel assembly 1 and the optical fiber 11 increases, an optical signal generated from the optical fiber 11 may become weak. Thus, in light thereof, the thickness d2 of the shielding material may be formed in the range of about 30 mm.

Moreover, in the present embodiment, although the collimator 13 has a cylindrical structure, it may be formed in structures having various shapes, such as a polygonal shape, and the like, according to an installation method of the probe.

Hereinafter, a system for identifying the burnup of a spent nuclear fuel assembly having a gamma-ray sensing probe using the Cerenkov effect as described above will be hereinafter described.

The system for identifying the burnup of a spent nuclear fuel assembly according to the present invention is a system for identifying the burnup of the spent nuclear fuel assembly as a requirement for examination according to the regulation of delivery before conveying the spent nuclear fuel assembly stored in an on-site storage pool of a nuclear power plant to an intermediate storage facility, the system measuring the burnup from the spent nuclear fuel assembly that is pulled out of the on-site storage pool of the nuclear power plant in order to be conveyed to the intermediate storage facility.

Figure 3:
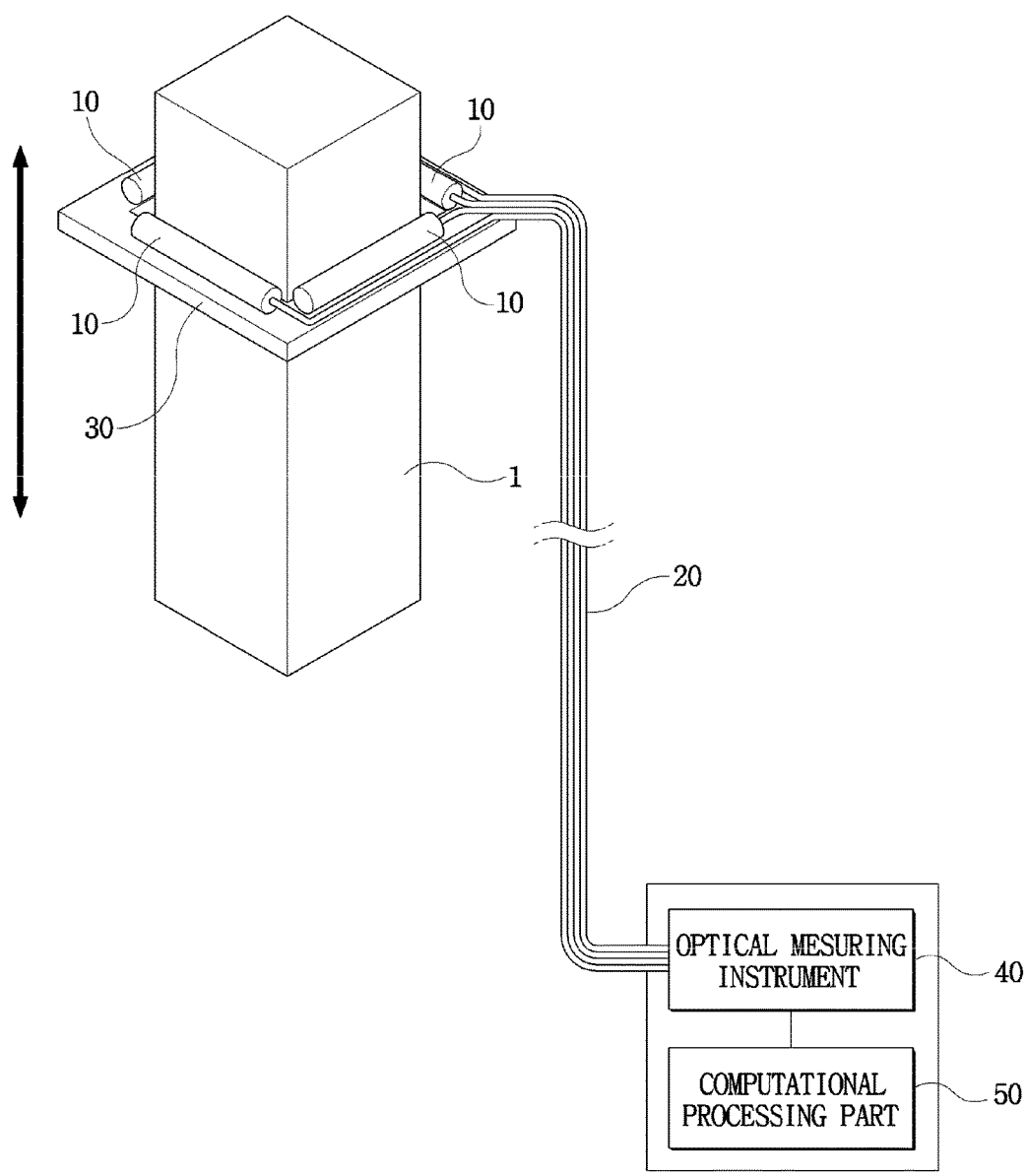
FIG. 3 is a view showing the configuration of a system for identifying the burnup of a spent nuclear fuel assembly according to an embodiment of the present invention.

FIG. 3 is a view showing the configuration of a system for identifying the burnup of a spent nuclear fuel assembly according to an embodiment of the present invention.

As illustrated in FIG. 3, the system for identifying the burnup of a spent nuclear fuel assembly according to the embodiment of the present invention includes: a gamma-ray sensing probe 10 disposed in a plural number to surround a circumference of the spent nuclear fuel assembly 1, the gamma-ray sensing probes reacting to gamma rays coming from the spent nuclear fuel assembly 1 and generating optical signals by the Cerenkov effect; an optical fiber transmission line 20 transmitting optical signals generated from the gamma-ray sensing probe 10; a lift driving part 30 lifting the gamma-ray sensing probe 10 in a lengthwise of the spent nuclear fuel assembly 1; an optical measuring instrument 40 measuring the quantity of light of the optical signals transmitted through the optical fiber transmission line 20; and a computational processing part 50 analyzing a measurement result of the optical measuring instrument 40 and calculating intensity of the gamma rays coming from the spent nuclear fuel assembly 1, the computational processing part measuring burnup of the spent nuclear fuel assembly 1 based on the calculated intensity of the gamma rays.

The gamma-ray sensing probe 10 is disposed in a plural number to surround a circumference of the spent nuclear fuel assembly 1 in order to measure the gamma rays coming from the spent nuclear fuel assembly 1 from every direction, thereby scanning an outer circumferential surface of the spent nuclear fuel assembly 1.

In the present embodiment, as illustrated in FIGS. 3, each of the gamma-ray sensing probes 10 is disposed on a front surface, a rear surface, a left side surface, and a right side surface of the spent nuclear fuel assembly 1 formed in a rectangular shape, thereby surrounding the four surfaces of the spent nuclear fuel assembly 1 erected in a longitudinal direction. The four gamma-ray sensing probes 10 are lifted by the lift driving part 30 along a lengthwise direction of the spent nuclear fuel assembly 1 and are configured to scan the outer circumferential surface of the spent nuclear fuel assembly 1, thereby sensing gamma rays coming from the front surface, the rear surface, the left side surface, and the right side surface of the spent nuclear fuel assembly 1.

The optical fiber transmission line 20 connects the gamma-ray sensing probes 10 and the optical measuring instrument 40 and transmits the optical signals generated from the gamma-ray sensing probes 10 to the optical measuring instrument 40.

Figure 4:
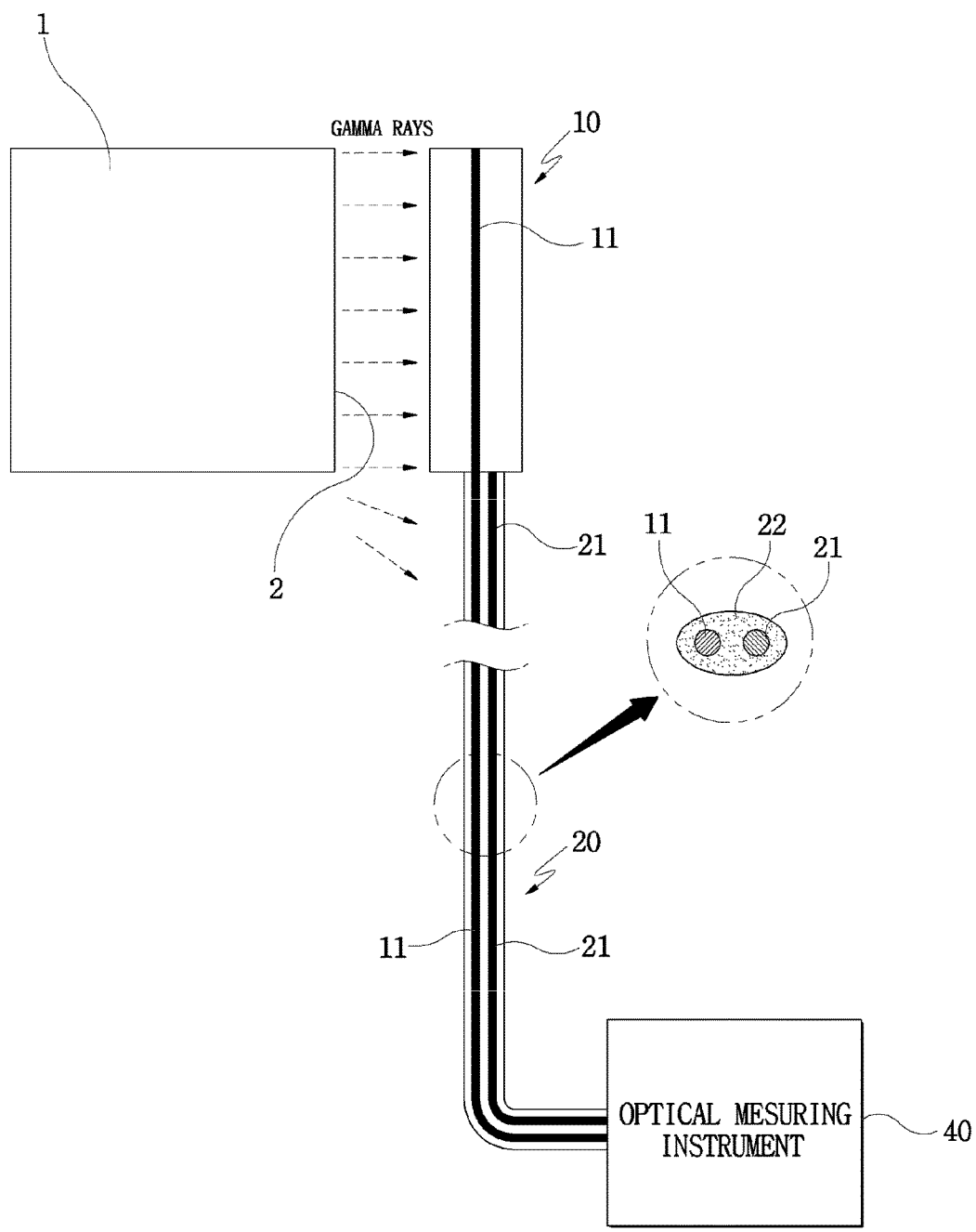
FIG. 4 is a view showing a structure of an optical fiber transmission line connecting gamma-ray sensing probes and an optical measuring instrument in the embodiment of the present invention.

FIG. 4 is a view showing a structure of the optical fiber transmission line connecting the gamma-ray sensing probes and the optical measuring instrument in the embodiment of the present invention.

As illustrated in FIG. 4, the optical fiber transmission line 20 includes an auxiliary optical fiber 21 and is connected to the optical measuring instrument 40, wherein the auxiliary optical fiber is disposed at an end of the optical fiber 11 formed to extend from the gamma-ray sensing probe 10, and an end of the gamma-ray sensing probe 10 and is integrally coated with the optical fiber 11 extending from the gamma-ray sensing probe 10 via a cladding tube 22.

In this case, the reason why the auxiliary optical fiber 21 disposed at the end of the gamma-ray sensing probe 10 is further provided at the optical fiber transmission line 20 is because light generated from the optical fiber by the Cerenkov effect is generated from all parts of the optical fiber that are affected by the gamma rays coming from the entire of the spent nuclear fuel assembly 1 to a 4π direction, rather than being generated from only the optical fiber within the gamma-ray sensing probe 10 that is adjacent to the gamma-ray test surface 2 of the spent nuclear fuel assembly 1. As such, this is intended to accurately measure intensity of the gamma rays generated from the gamma-ray test surface 2 by minimizing signal distortion caused by light that is incidentally generated.

Thus, when the intensity of gamma rays emitting from the gamma-ray test surface 2 of the spent nuclear fuel assembly 1 is measured, an optical signal is detected by subtracting an amount of light, emitted from the auxiliary optical fiber 21 provided at the optical fiber transmission line 20 and transmitted to the optical measuring instrument 40, from an entire amount of light, emitted from the optical fiber 11 provided at the gamma-ray sensing probe 10 and the optical fiber transmission line 22 and transmitted to the optical measuring instrument 40. Thus, intensity of the gamma rays generated from the corresponding gamma-ray test surface 2 of the spent nuclear fuel assembly 1 may be accurately measured.

In this case, measurement of the rays emitted from the optical fiber 11 and the auxiliary fiber 21 by the Cerenkov effect, and measurement of the intensity of gamma rays using the measurement of the amount of the rays are performed by the optical measuring instrument 40 and the computational processing part 50 that will be described later.

Meanwhile, the lift driving part supports the gamma-ray sensing probes 10 disposed in a plural number to surround the circumference of the spent nuclear fuel assembly 1, and lifts the gamma-ray sensing probes 10 in a lengthwise of the spent nuclear fuel assembly 1 according to the control of a control part (not shown).

That is, when the lift driving part 30 is driven, the gamma-ray sensing probes 10 disposed in a plural number to surround the circumference of the spent nuclear fuel assembly 1 are lifted in the lengthwise of the spent nuclear fuel assembly 1 so as to entirely scan the outer circumferential surface of the spent nuclear fuel assembly 1.

This lift driving part 30 may be configured by the combination of a motor and a gear, and in addition to this, various other lifting means other than the lift driving part may be also applied.

The optical measuring instrument 40 is connected to the gamma-ray sensing probe 10 via the optical fiber transmission line 20 and measures the amount of light of the optical signals transmitted from the gamma-ray sensing probe 10.

That is, the optical measuring instrument 40 receives the optical signals transmitted from the gamma-ray sensing probes 10 and converts the optical signals into electrical signals. Also, the optical measure instrument analyzes the converted electrical signals, thereby measuring the amount of light of the optical signals transmitted from gamma-ray sensing probes 10.

The computational processing part 50 receives a measurement result of the amount of light transmitted from the optical measuring instrument 40 in a signal form and calculates intensity of the gamma rays based on the measurement result of the amount of light, thereby measuring the burnup of spent nuclear fuel based on calculated intensity of the gamma rays.

As described above, in the gamma-ray sensing probe using the Cerenkov effect, and the system for identifying the burnup of a spent nuclear fuel assembly using the gamma-ray sensing probe according to the present invention, when the gamma rays of the spent nuclear fuel assembly are measured using the gamma-ray sensing probe, since optical signals generated by the Cerenkov effect resulting from gamma rays may be amplified by the scatterer surrounding the optical fiber, signal measurement can be easily performed, and the intensity of gamma rays coming from a specific gamma ray test surface in the spent nuclear fuel assembly, for which measurement is required, can be accurately measured by utilizing the collimator, thereby enabling the accurate determination of burnup of the spent nuclear fuel assembly, for which inspection is required according to the regulations of delivery when the spent nuclear fuel assembly stored in an on-site storage pool of a nuclear power plant is delivered to an intermediate storage facility.

The present invention, however, is not limited to only the embodiments set forth herein and the accompanying drawings because those skilled in the art will appreciate that the present invention can be embodied in many alternate forms within the spirit and scope of the technical idea of the present invention.

INDUSTRIAL APPLICABILITY

According to a gamma-ray sensing probe using the Cerenkov effect, and a system for identifying the burnup of a spent nuclear fuel assembly using the gamma-ray sensing probe according to the present invention, the intensity of gamma rays coming from the spent nuclear fuel assembly can be accurately measured by the gamma-ray sensing probe, thereby enabling the accurate determination of burnup of the spent nuclear fuel assembly, for which inspection is required according to the regulations of delivery when the spent nuclear fuel assembly stored in an on-site storage pool of a nuclear power plant is delivered to an intermediate storage facility.

The gamma-ray sensing probe using the Cerenkov effect, and the system for identifying the burnup of a spent nuclear fuel assembly using the gamma-ray sensing probe may be usefully applied to various technical fields for which measurement of the intensity of gamma rays is needed.

What is claimed is:

1. A system for identifying burnup of a spent nuclear fuel assembly, comprising:
    a plurality of gamma-ray sensing probes disposed to surround the perimeter of the spent nuclear fuel assembly, the gamma-ray sensing probes reacting to gamma rays coming from the spent nuclear fuel assembly and generating optical signals by the Cerenkov effect, said gamma-ray sensing probes comprising:
        an optical fiber disposed to face a gamma-ray test surface of a spent nuclear fuel assembly in a direction perpendicular to a lengthwise direction of the spent nuclear fuel assembly, the optical fiber reacting to gamma rays coming from the gamma-ray test surface and causing Compton scattering to emit light in the optical fiber by the Cerenkov effect;
        a scatterer extending along the length of, and formed to surround an outer circumferential surface of, the optical fiber, the scatterer reacting to gamma rays incident from the gamma-ray test surface of the spent nuclear fuel assembly and causing Compton scattering to produce Campton electrons, the Campton electrons pass through the optical fiber and generate light due to the Cerenkov effect in the optical fiber; and
        a collimator surrounding an outer circumferential surface of the scatterer and composed of a shielding material, the collimator having a slit groove formed at one side thereof, for passing gamma rays coming from a part of the gamma-ray test surface, for which measurement is required, through the scatterer;
    an optical fiber transmission line transmitting optical signals generated from the gamma-ray sensing probes;
    a lift driving part lifting the gamma-ray sensing probes in a direction lengthwise of the spent nuclear fuel assembly;
    an optical measuring instrument measuring the amount of light of the optical signals transmitted through the optical fiber transmission line; and
    a computational processing part analyzing the measurement results of the optical measuring instrument and calculating intensity of gamma rays coming from the spent nuclear fuel assembly, the computational processing part determining burnup of the spent nuclear fuel assembly based on the calculated intensity of the gamma rays.

2. The system of claim 1, wherein:
    the optical fiber transmission line is disposed at an end of the optical fiber formed to extend from the gamma-ray sensing probe and includes an auxiliary optical fiber transmission line that is integrally coated with the optical fiber extending from the gamma-ray sensing probe via a cladding tube.

3. The system of claim 2, wherein the computational processing part determines the intensity of gamma rays generated from a gamma-ray test surface by subtracting an amount of light measured by the auxiliary optical fiber from an amount of light measured by the optical fiber provided at the gamma-ray sensing probes and the optical fiber transmission line.

* * * * *